United States Patent [19]

Tsutsui et al.

[11] Patent Number: 5,400,961
[45] Date of Patent: Mar. 28, 1995

[54] ELECTROMECHANICAL THERMOSTATIC MIXING VALVE

[75] Inventors: Osamu Tsutsui; Kinya Arita; Yoshinobu Uchimura; Yasuhide Kimura, all of Fukuoka, Japan

[73] Assignee: Toto Ltd., Rukuoka, Japan

[21] Appl. No.: 211,124

[22] PCT Filed: Jul. 19, 1993

[86] PCT No.: PCT/JP93/00999

§ 371 Date: May 3, 1994

§ 102(e) Date: May 3, 1994

[87] PCT Pub. No.: WO94/02766

PCT Pub. Date: Feb. 3, 1994

[30] Foreign Application Priority Data

Jul. 20, 1992 [JP] Japan ................. 4-214548
Nov. 13, 1992 [JP] Japan ................. 4-328450

[51] Int. Cl.[6] .......................................... G05D 23/13
[52] U.S. Cl. ......................... 236/12.12; 236/12.2; 236/101 D
[58] Field of Search ........... 236/12.12, 12.22, 12.21, 236/12.2, 101 R, 101 D; 137/88

[56] References Cited

U.S. PATENT DOCUMENTS

| 4,029,256 | 6/1977 | Dauga | 137/625.4 X |
| 4,349,149 | 9/1982 | Humpert | |
| 4,640,457 | 2/1987 | MacDonald | 236/12.11 |
| 5,025,983 | 6/1991 | Akita | 236/12.2 |
| 5,261,597 | 11/1993 | Perlman | 236/101 D |

FOREIGN PATENT DOCUMENTS

| 58-11177 | 1/1983 | Japan . |
| 58-24669 | 2/1983 | Japan . |
| 58-187666 | 12/1983 | Japan . |
| 60-249783 | 12/1985 | Japan . |
| 61-31784 | 2/1986 | Japan . |
| 61-23987 | 7/1986 | Japan . |
| 61-150585 | 9/1986 | Japan . |
| 61-44062 | 12/1986 | Japan . |
| 136261 | 5/1977 | Norway . |

OTHER PUBLICATIONS

Patent Abstracts of Japan, vol. 12, No. 160, M-697, abstract of JP, A, 62-278389, Dec. 3, 1987.

Primary Examiner—William E. Wayner
Attorney, Agent, or Firm—Lowe, Price, LeBlanc & Becker

[57] ABSTRACT

An electromechanically controlled thermostatic mixing valve (10) comprises a movable mixing valve member (114) resiliently held between a temperature responsive coiled spring (132) and a bias spring (134). The temperature responsive spring is made of a material such as a shape memory alloy (SMA) having a modulus of elasticity that varies with temperature. The bias spring is supported by an electric drive (46) controlled by an electric control circuit (32) to adjust the preload on the bias spring. In contrast to the bias spring which is subjected to deformation from its free state to its fully compressed state, the SMA spring is held in such a manner that it is subjected to a limited strain throughout the stroke of the valve member. As a result, premature fatigue of the SMA spring is avoided. Transient fluctuation in water temperature is primarily compensated for by a mechanical feedback control performed by the SMA spring. Any persistent offset of temperature is compensated for by electrical feedback control carried out by the electrical control circuit that adjust the preload on the bias spring preload such that the actual water temperature is brought to the desired temperature.

10 Claims, 10 Drawing Sheets

ELECTROMECHANICAL THERMOSTATIC MIXING VALVE

TECHNICAL FIELD

The present invention relates to a thermostatic mixing valve for use with sinks, wash basins, bathtubs, showers and like facilities for mixing hot and cold water to deliver a mixture of a controlled temperature. More particularly, this invention is concerned with an electromechanical thermostatic mixing valve wherein transient fluctuation in the temperature is primarily compensated for by a mechanical feedback control performed by a thermostatic control element and persistent offset of the temperature is primarily compensated for by an electrical feedback control carried out by an electrical control circuit.

BACKGROUND ART

As is well-known, the conventional thermostatic mixing valves typically include a thermostatic control element of the so-called "wax" type wherein thermally expansive paraffin wax composition is charged. The control element is adapted to feedback control the position of a mixing valve member in response to the temperature of a mixture of hot and cold water in such a manner that a mixture having a desired temperature is provided. When fluctuation occurs in the supply line pressures, supply temperatures or flow rates, causing a change in the mixture temperature, the heat sensitive wax composition expands or contracts in response to such temperature change to automatically displace the valve member. After repeating a number of cycles of overshooting and undershooting, the valve member will finally be adjusted to a new position wherein the actual mixture temperature is brought close to the desired temperature.

Generally, the paraffin wax composition used in the thermostatic control elements is adapted to exhibit a volumetric change due to phase transformation between the solid and liquid phases. Because such change in phase necessarily involves absorption and evolution of the latent heat, in addition to transfer of the sensible heat, the heat capacity thereof is considerably large. Moreover, the paraffin composition has a poor thermal conductivity. Accordingly, the disadvantage of the wax type thermostatic element is that the responsiveness thereof is limited. It has often been observed that, once transitional change has occurred in water temperature for any reasons, several seconds of overshooting and undershooting of temperature of an intolerable magnitude unavoidably last in the conventional mixing valves before the delivery of water having the desired temperature is resumed.

In order to improve the responsiveness, use of a thermostatic control element made of a shape memory alloy such as an alloy formed of nickel and titanium has been proposed in the prior art (see, e.g., Japanese Utility Model Kokai Publication No. 58-11177; Japanese Patent Kokai Publication No. 58-24669; Japanese Utility Model Kokai Publication No. 58-187666; Japanese Utility Model Kokoku Publication No. 61-44062; Japanese Utility Model Kokoku Publication No. 61-23987; Japanese Utility Model Kokai Publication No. 61-150585). These references generally refer to the shape memory alloy (SMA) as being a metal having a shape memory effect wherein the shape of an article deformed below the martensitic transition temperature of the SMA tends to spring back to the initial shape imparted in the austenitic mother phase when heated above the transition temperature. It is believed, however, that the property of the SMA that the modulus of elasticity thereof varies with temperature is more important in its application to the thermostatic control elements.

The prior art cited above discloses a thermostatic mixing valve having a coiled spring made of the SMA. Throughout various references, a valve member controlling the flow of hot and cold water is supported between the coiled spring made of the SMA and another coiled bias spring made of the conventional spring steel. The valve member is held in such a position that the spring force of the SMA spring and that of the bias spring are balanced. During transitional condition wherein the mixture temperature is altered, the spring force of the SMA spring varies in response to the temperature change, causing the valve member to move until the balance is resumed between the SMA and bias springs. Some of the references propose to provide an adjusting handle adapted to alter the preload either of the SMA spring or the bias spring to enable the user to adjust the desired mixture temperature.

Obviously, the use of the SMA coiled spring as the temperature responsive thermostatic control element is advantageous in providing an improved responsiveness of the mixing valve since the SMA is metallic and therefore has a small heat capacity and an increased thermal conductivity as compared with the conventional paraffin wax composition.

Notwithstanding the advantage thereof mentioned, however, it appears that, hitherto, a commercially feasible thermostatic mixing valve employing the SMA coiled spring has never been realized.

The problem associated with the coiled springs made of an SMA such as a nickel and titanium alloy is that, currently, those SMA springs which can develop an adequately strong spring force enough to control the valve member of the mixing valve for a sufficiently long period commensurate with the service life of the mixing valve are not commercially available.

The primary reason is that they are subject to thermomechanical fatigue when operated under excessively loaded conditions. More specifically, the modulus of elasticity of the SMA is prematurely degraded if subjected to hot-and-cold heat cycles under an excessive strain. Application of excessive strain would result in an earlier fatigue of the SMA coiled spring so that the spring force obtainable thereby is prematurely decreased during heat cycles. Although the mechanism of the degradation in the modulus of elasticity of the SMA or the thermomechanical fatigue of the SMA spring is not known with any degree of certainty, it is believed that the number of crystals which are involved in the martensitic transformation is decreased with time when the SMA coiled spring is excessively deformed. To avoid premature fatigue, the coiled spring of SMA must not be subjected to excessive strain. It is to be noted that the amount of strain permissible for the commercially available SMA springs is extremely small as compared with a coiled spring made of the ordinary spring steel. As the spring force developed by a coiled spring is proportional to the amount of strain (degree of deformation) caused by a stress (load) applied to compress the spring, only a limited spring force will be available if it is to be used under a limited strain condition.

A secondary reason is that the SMA coiled springs formed from an SMA wire having such a diameter large enough to develop a strong spring force are difficult to manufacture and, therefore, are presently extremely expensive.

Accordingly, it is desirable to use a small sized SMA coiled spring and to operate it in such a manner as to develop as small spring force as possible.

These requirements, however, give rise to other problems which must also be overcome in designing commercially feasible thermostatic mixing valves employing the SMA spring.

First, in contrast to the conventional thermostatic mixing valve wherein the flow control valve member is relatively rigidly and forcibly positioned by the wax type thermostatic control element designed to develop a thrust in the order of 15 kg and by an adequately strong return spring having a spring force of 4–5 kg, the flow control valve member in the mixing valves incorporating the SMA spring is resiliently positioned between the SMA coiled spring and the bias coiled spring which are acting on the valve member in the opposite directions. In the balanced position, the resultant force of these springs is zero so that the valve member is in a pressure sensitive condition. Therefore, when there exists or occurs a pressure difference between the hot and cold water, the valve member will readily be thrust due to the hydraulic force if the SMA spring is designed and arranged to exhibit a limited spring force. This would result in the deviation or offset of the mixture temperature from the desired value.

Second, the valve member is more or less subject to frictional resistance which resists the sliding movement of the valve member. Each time the valve member is to be moved to a new position to perform its temperature control function, the SMA spring or the bias spring must overcome the frictional resistance. Such frictional resistance brings about a hysteresis loop in the temperature vs. spring force curve. This also leads to the offsetting of the mixture temperature. Smaller the spring force of the SMA spring is, the effect of the frictional resistance becomes greater and not negligible.

DISCLOSURE OF INVENTION

Accordingly, the primary object of the invention is to provide a thermostatic mixing valve adapted to control the temperature of a mixture of hot and cold water to a desired value throughout the service life of the mixing valve by a thermostatic control element of the SMA spring designed and arranged to develop a limited spring force.

Another object of the invention is to provide a thermostatic mixing valve incorporating the SMA spring of a limited spring force and which is yet operable to eliminate the effect of differential pressure existing between the hot and cold water inlet pressures.

A still another object of the invention is to provide a thermostatic mixing valve incorporating the SMA spring of a limited spring force and which is yet operable to compensate for the offset of temperature resulting from frictional resistance to which the valve member is subjected.

A further object of the present invention is to provide a thermostatic mixing valve which is operable to control the temperature of a mixture of hot and cold water with a high degree of responsiveness.

Another object of the invention is to provide a thermostatic mixing valve which is capable of controlling the mixture temperature with a high degree of accuracy.

A still another object of the invention is to provide a thermostatic mixing valve having an improved responsiveness and which is operable to accurately control the mixture temperature for a prolonged period of time.

A further object of the invention is to provide an electromechanical thermostatic mixing valve wherein transient fluctuation in the mixture temperature is quickly compensated for by a mechanical feedback control of the SMA spring and wherein persistent offset of the mixture temperature is compensated for by an electrical feedback control.

The electromechanical thermostatic mixing valve according to the invention comprises a movable flow control valve member resiliently supported between a coiled first or temperature responsive spring and a coiled second or bias spring. The temperature responsive spring is made of a material having a modulus of elasticity which varies with temperature. Accordingly, the spring constant and, hence, the spring force thereof vary according to temperature. An example of the material forming the first spring is the shape memory alloy (SMA) such as the conventional nickel and titanium alloy. The bias spring is an ordinary coiled spring having a predetermined spring constant substantially independent of the temperature.

The temperature responsive spring of SMA is arranged in such a manner that it is held in a slightly preloaded or compressed state throughout the stroke of the valve member. In contrast, the bias spring is arranged for deformation between a free state thereof and a fully preloaded or compressed state. To this end, an end of the bias spring is supported by an electrical drive which is adapted to adjustably vary the preload imparted to the bias spring and which is controlled by an electrical control unit.

The mixing valve further comprises temperature setting switches to enable the user to select a desired mixture temperature. The control unit controls the electrical drive to vary the preload on the bias spring in accordance with the desired temperature selected by the user.

During the minimum temperature condition wherein the user selected delivery of cold water, the control unit operates the electrical drive to fully relieve the preload on the bias spring to permit it to spring back to its free state. In this condition, the SMA spring will undergo no counteractive force of the bias spring. As a result, the spring force of the SMA spring is fully available to bias the valve member against its hot water shut-off position. Accordingly, although in the minimum temperature condition the spring force developed by the SMA spring is correspondingly minimum, a sufficient sealing pressure is established to shut off the hot water.

During the maximum temperature condition wherein the user selected delivery of hot water, the control unit operates the electrical drive to fully compress the bias spring. This is done against the action of the increased spring force of the SMA spring. The SMA spring will be fully compressed as the valve member has been moved to the cold water shut-off position. However, since the SMA spring is initially in a only slightly compressed state and because the stroke of the valve member is of a limited distance, the SMA spring will not undergo excessive deformation.

With this arrangement, therefore, the degree of strain that the SMA spring suffers is minimized. This is favorable in preventing the SMA spring from premature fatigue and in effectively operating it throughout the service life of the mixing valve. If, to the contrary, the electric drive were to act on the SMA spring, the SMA spring would prematurely fatigue as it is subjected to excessive strain during deformation from its free state to the fully compressed state. As described later, according to the arrangement of the invention, the strain experienced by the SMA spring can be limited to one half of the strain which would otherwise be experienced when the electric drive were to act on the SMA spring.

During the intermediate temperature condition wherein the mixture of hot and cold water having a controlled temperature is delivered, the valve member is resiliently held between the SMA spring and the bias spring. The SMA spring promptly responds to any transient change in the mixture temperature to control via mechanical feedback the valve member with a high degree of responsiveness.

The mixing valve further comprises a temperature sensor adapted to detect the actual temperature of the mixture. The control unit monitors the actual mixture temperature as detected by the temperature sensor and controls via electrical feedback the electrical drive to vary the preload on the bias spring in such a manner that the actual mixture temperature is brought to the desired temperature selected by the user. The electrical feedback control based on the actual mixture temperature sensed by the temperature sensor advantageously compensates for any continuing and persistent temperature offset due to pressure difference between the hot and cold water inlet pressures and due to the frictional resistance of the valve member. Other offsets resulting from the hysteresis of the SMA spring and any degradation of the component parts of the mixing valve are also settled.

In the preferred forms of the invention, pressure control valves, such as pressure reduction valves, pressure equalizing valve and pressure difference control valve, are provided to reduce or equalize the hot and cold water supply pressures or make pressure difference constant. With this arrangement, the effect of supply line pressure fluctuation, being one of the external disturbances, is eliminated or decreased. Therefore, the number and extent of electrical feedback control is minimized. This is advantageous in providing a battery operated mixing valve wherein the electrical drive is powered by a battery. A battery operated mixing valve is easy to install because wiring to the AC power lines can be eliminated.

Preferably, the SMA spring is so designed and arranged as to develop a spring force of less than 700 g, preferably less than 500 g, during the minimum temperature condition. Such limitation on the spring force is preferable especially when the electrical drive is battery operated. In order to permit the SMA spring to displace the valve member with the limited spring force, the conventional sealing arrangement apt to give rise to frictional resistance is preferably eliminated.

In another preferred form of the invention, the valve member is associated with a pressure receptive arrangement which is adapted to counterbalance the hydraulic force acting on the valve member due to the inlet pressure at the cold water inlet with the hydraulic force acting on the valve member due to the inlet pressure at the hot water inlet. With this arrangement, the effect of differential pressure existing between the hot and cold water supply pressures is eliminated.

These features and advantages of the invention as well as other features and advantages thereof will become apparent when reading the following description in conjunction with the accompanying drawings.

BRIEF DESCRIPTION OF DRAWINGS

Throughout different drawings, similar parts and members are designated by like reference numerals.

BEST MODE FOR CARRYING OUT THE INVENTION

Figure 1:
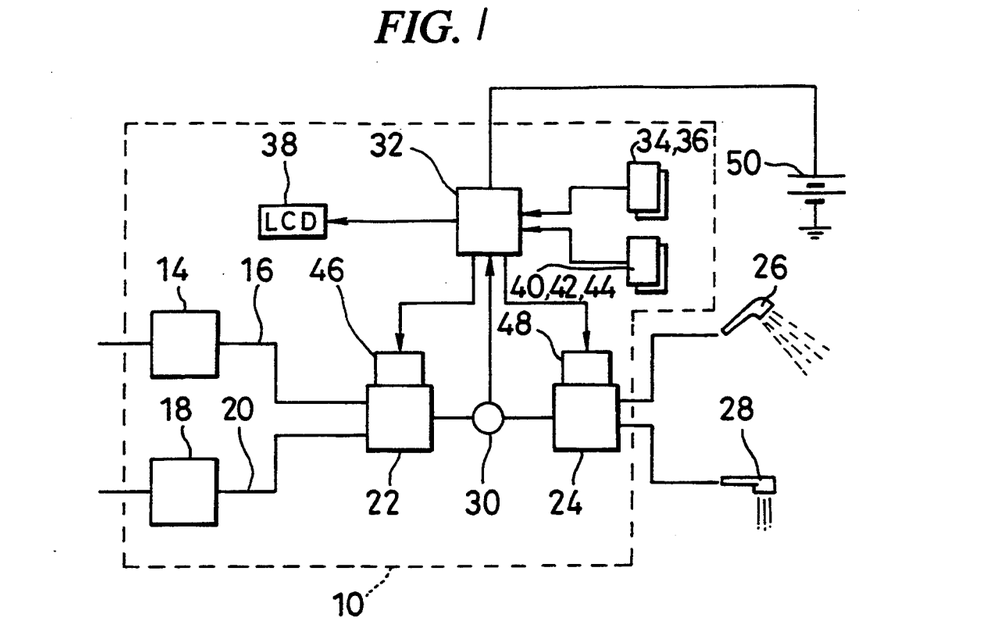
FIG. 1 is a diagrammatic representation showing the mixing valve according to the first embodiment of the invention.
Figure 2:
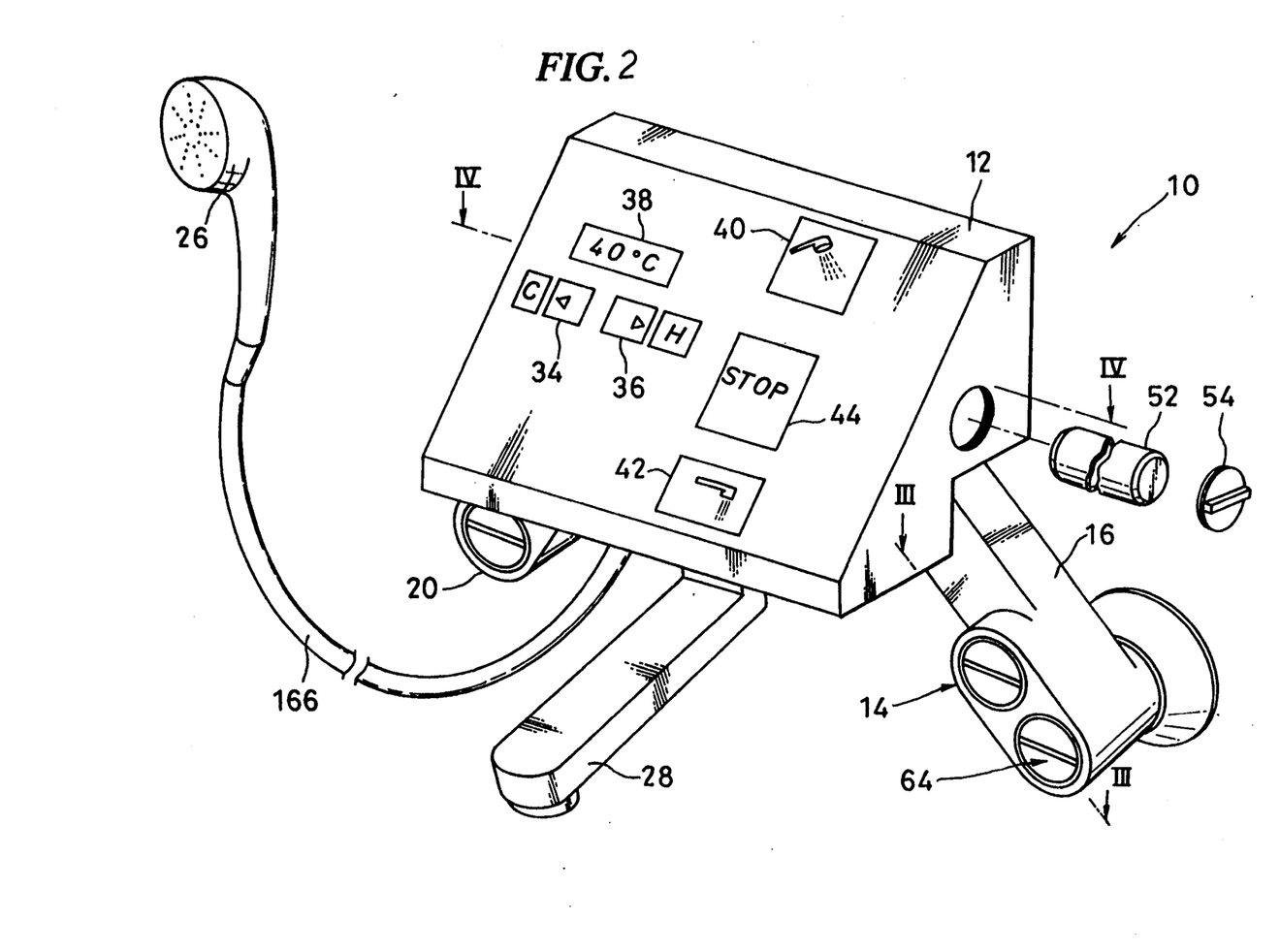
FIG. 2 is a perspective view of the first embodiment.

The first embodiment of the invention will be described with reference to FIGS. 1-7 wherein a battery-operated SMA-controlled electromechanical mixing valve suitable for installation in a bathroom is shown. Referring to FIGS. 1 and 2, the mixing valve 10 has a housing 12 which is adapted to receive a supply of cold water from a water supply line (not shown) through a cold water inlet fitting 16 wherein a pressure reduction valve 14 is incorporated. The housing 12 is also adapted to receive a supply of hot water from a suitable hot water source such as a boiler (not shown) via a hot water inlet fitting 20 incorporating a pressure reduction valve 18. Hot and cold water is mixed by a mixing section 22 arranged within the housing 12 and the resultant mixture of hot and cold water is selectively delivered through a flow control valve 24, also arranged within the housing 12, to a shower head 26, or a faucet spout 28. The temperature of the mixture is detected by a temperature sensor such as a thermistor 30 and the temperature information is forwarded to a control circuit 32 suitably arranged within the housing 12.

As best shown in FIG. 2, the housing 12 is provided with temperature input switches 34 and 36 to enable the user to select a desired mixture temperature as well as a liquid crystal display (LCD) panel 38 for indicating the selected temperature. In the illustrated embodiment, the input switch 34 is intended to decrement the desired temperature, while the other switch 36 is used for incrementation. The housing 12 is further provided with a switch 40 for instructing delivery to the shower head 26, another switch 42 for selecting delivery to the faucet spout 28, and a switch 44 for commanding termination of delivery. Commands from these switches are input into the control unit 32. The control unit 32 is adapted to control an electric drive 46, described later, of the mixing section 22 in accordance with the actual water temperature as detected by the thermistor 30 and the desired water temperature as selected by the switches 34 and 36, it being understood that in certain occasion, a default value as set by the control unit 32 may be used as the desired temperature as described later. The control unit 32 is also designed to control an electric motor 48 for the flow control valve 24 according to the commands from the switches 40, 42 and 44. In the illustrated battery operated version, the electric power necessary to drive the electric drive 46, the motor 48 for the control valve 24, the control unit 32, and the LCD 38 is supplied by batteries 50 such as dry cells. To this end, the housing 12 is adapted to receive a waterproof battery casing 52 wherein a plurality of UM3 dry cells are replaceably installed. The opening for the battery casing is closed by a cap 54 screwed to the housing 12.

Figure 3:
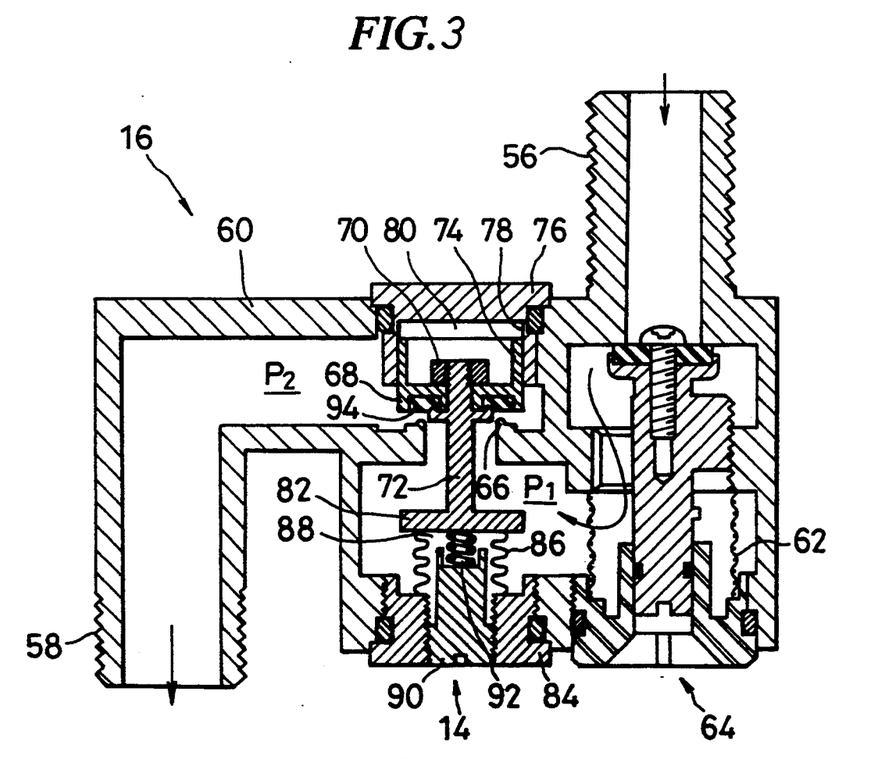
FIG. 3 is a cross-sectional view taken along the line III—III of FIG. 2 and showing the pressure reduction valve incorporated within the inlet fitting.

Referring to FIG. 3, there is shown in an enlarged scale the cold water inlet fitting 16 incorporating the pressure reduction valve 14. The inlet fitting 16 is designed to supply the cold water to the mixing section 22 after the pressure thereof has been reduced by the pressure reduction valve 14. The fitting 16 has a casing 60 having an inlet 56 adapted to be connected to the cold water supply line and an outlet 58 in communication with the mixing section 22. The casing 60 may include a conventional stop valve 64 with a strainer 62.

The pressure reduction valve 14 comprises an annular valve seat 66 formed in the casing 60 and a disc-shaped movable closure member 68 that cooperates with the valve seat 66 to regulate the flow of water. The closure member 68 is fixed by a nut 70 to a valve shaft 72. The closure member 68 is provided with an upwardly extending inverted skirt portion 74 which is axially slidably fitted within a bore 78 formed in a guide member 76 fluid-tightly secured to the casing 60. The skirt portion 74 is loosely fitted within the bore 78 with a small clearance therebetween to ensure that the secondary pressure downstream of the valve seat 66 is introduced into the secondary pressure chamber 80 defined by the closure member 68, the skirt 74 and the guide member 76. The valve shaft 72 is provided at the lower end thereof with a spring retainer 82. A metallic bellows arrangement 86 is liquid tightly arranged between the retainer 82 and a cap 84, threadingly secured to the casing 60, to define an atmospheric pressure chamber 88. The bellows 86 sealingly engages the retainer 82 and the cap to prevent water under the primary pressure upstream of the valve seat 66 from leaking into the chamber 88 and also functions as a spring that biases the closure member 68 upwards away from the valve seat. The bellows 86 has an effective pressure receptive area equal to that of the valve seat 66. Accordingly, the hydraulic force acting upwardly on the closure member 68 due to the primary pressure and the hydraulic force acting downwardly on the retainer 82 due to the primary pressure are equal and, therefore, will be cancelled. The closure member 68 is biased upwards by a spring 92 engaging the spring retainer 82 and adjustably supported by an adjusting screw 90 screwed into the cap 84. The closure member 68 is provided with an elastomeric sealing member 94 resiliently engageable with the valve seat 66.

The mode of operation of the pressure reduction valve 14 is as follows. As the hydraulic force acting upwardly on the closure member 68 due to the primary pressure $P_1$ and the hydraulic force acting downwardly on the retainer 82 due to the primary pressure $P_1$ are cancelled as described before, the closure member 68 is subjected to the hydraulic force acting thereon downwardly due to the secondary pressure $P_2$ in the secondary pressure chamber 80 as well as to the upwardly directed spring forces of the bellows 86 and the spring 92. Therefore, the secondary pressure $P_2$ is determined only by the spring forces of the bellows 86 and the spring 92. As long as the secondary pressure $P_2$ is lower than a predetermined level dictated by these spring forces, the hydraulic force acting on the closure member 68 due to the secondary pressure $P_2$ in the secondary pressure chamber 80 will be overcome by the spring forces so that the closure member 68 is biased upwardly to allow water to flow downstream of the valve seat 66 thereby permitting a rise in the secondary pressure $P_2$. As the secondary pressure $P_2$ becomes higher than the predetermined level so that the hydraulic force acting on the closure member 68 due to the secondary pressure $P_2$ in the secondary pressure chamber 80 overcomes the spring forces, the sealing member 94 of the closure member 68 will be resiliently engaged against the valve seat 66 to shut off water flow. In this way, the pressure reduction valve 14 is operable to reduce the primary pressure down to the secondary pressure of a predetermined level. The secondary pressure $P_2$ may be adjusted by turning the adjusting screw 90 to vary the preload on the spring 92.

The inlet fitting 20 for the hot water is provided with the pressure reduction valve 18 in the manner similar to the cold water inlet fitting 16 and, therefore, need not be described. After the pressure thereof has been reduced by respective pressure reduction valves 14 and 18, hot water and cold water are forwarded to associated inlets of the mixing section 22.

Figure 4:
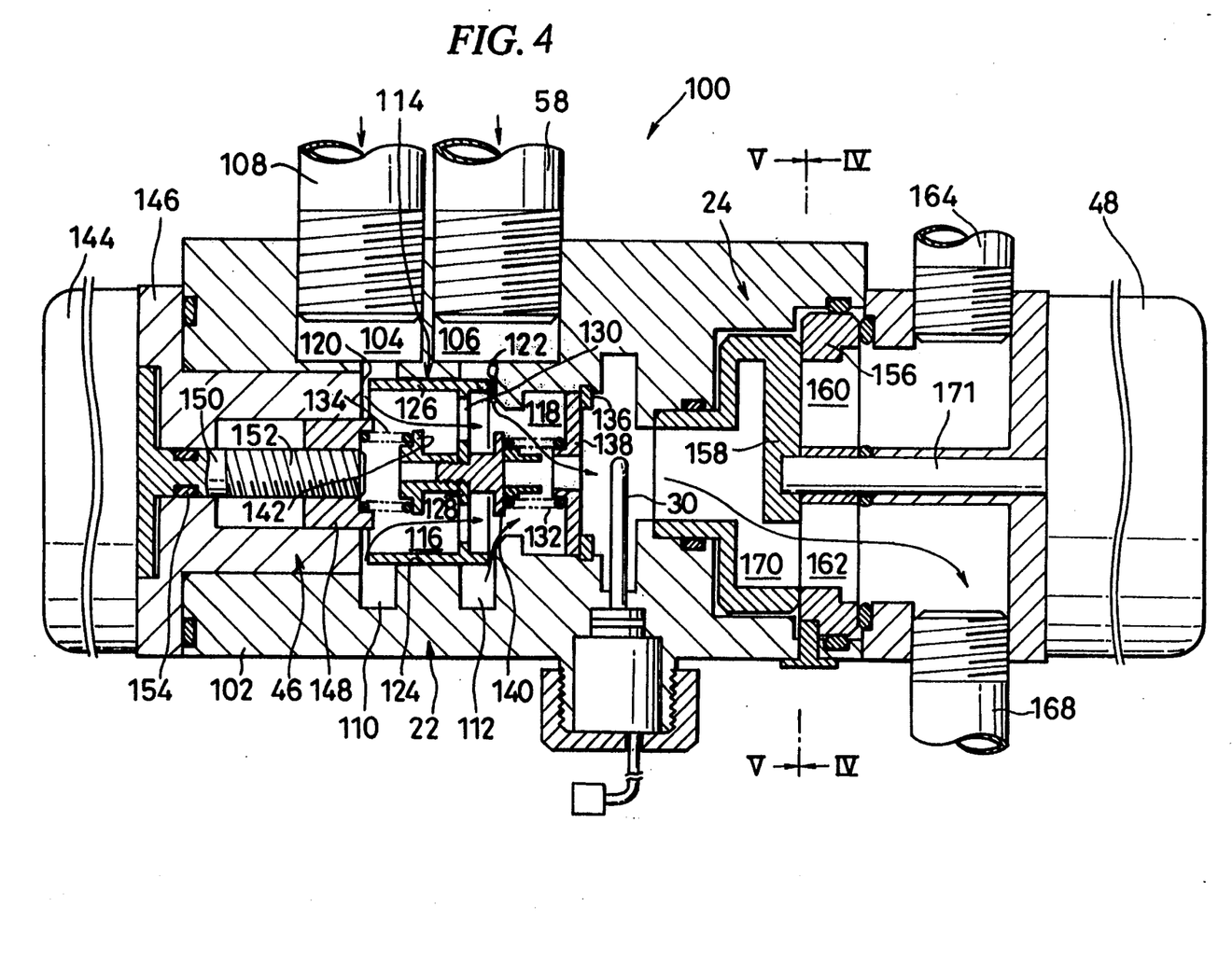
FIG. 4 is a cross-sectional view, partly cut away, taken along the line IV—IV of FIG. 2 and showing the valve unit arranged within the housing of the mixing valve.

Referring to FIG. 4, arranged in the housing 12 of the mixing valve 10 is a combined valve unit 100 incorporating the mixing valve section 22 and the flow control valve section 24. The valve unit 100 includes a housing 102 having a hot water inlet 104 and a cold water inlet 106, with an outlet 108 of the hot water inlet fitting 20 connected to the inlet 104, the outlet 58 of the cold water inlet fitting 16 being connected to the inlet 106.

The mixing section 22 includes annular passages 110 and 112 communicated, respectively, with the water inlets 104 and 106, a valve chamber 116 wherein a movable valve member 114 is axially moveably received, and a mixing chamber 118. The valve chamber 116 is defined by a valve seat 120 for hot water, a valve seat 122 for cold water, and an axial bore 124, the valve seats 120 and 122 being perpendicular to the axis of the mixing section 22. The movable valve member 114 has an outer cylindrical portion 126 and a radial web 128. The cylindrical portion 126 is clearance fitted within the bore 124, without a conventional sealing member such as an O-ring therebetween, to ensure that the valve member 114 axially slides within the bore 124 substantially without undergoing frictional resistance. The stroke of the valve member 114 is in the order of 1 mm.

It will be understood that axial displacement of the valve member 114 will result in a change in the mixing ratio of hot and cold water flowing into the valve chamber 116 so that the mixture temperature will be varied. The flow of hot water will be shut off by the valve member 114 with its left-hand edge abutting against the hot water valve seat 120, with the flow of cold water being shut off as the right-hand edge of the valve member sealingly engages the cold water valve seat 122. The web 128 of the valve member 114 is provided with a plurality of openings 130 to permit hot water entering from the inlet 104 into the valve chamber 116 to flow further into the mixing chamber 118 for mixing with cold water.

The movable valve member 114 is adapted to be displaced and positioned by a temperature responsive coiled spring 132 arranged in the mixing chamber 118 and by a bias spring 134 arranged in the valve chamber 116. Normally, the valve member 114 is resiliently supported between the springs 132 and 134 in such a position that the spring forces thereof are balanced. The temperature responsive spring 132 is made of a material, such as the conventional SMA including a nickel and titanium alloy, having a modulus of elasticity which varies with temperature. The SMA coiled springs suitable for use in the present invention are available from various sources such as Kantoc Special Steel K.K., of Fujisawa, Japan. The bias spring 134 is made of a spring steel having a constant modulus of elasticity.

The outer end of the SMA spring 132 is supported by a stationary spring retainer 138 fixed to the housing 102 by a snap ring 136, with the inner end thereof being supported by a movable spring retainer 140 secured to the valve member 114. The SMA spring 132 is held between the retainers 138 and 140 in a slightly compressed state such that the rate of bending strain of the spring 132 does not exceed about 1%, preferably 0.75%. Various parameters of the SMA spring 132, including the number of turn, wire diameter, coil diameter and modulus of elasticity, may be so selected that a spring force in the order of 700 g, preferably, 500 g, is developed within the above-mentioned limit of bending strain when the SMA spring is contacted with the cold water. The inner end of the bias spring 134 is received by a spring retainer 142 movable conjointly with the valve member 114 and the outer end thereof is adjustably supported by the electrical drive 46. To facilitate assembly, the spring retainer 140 is designed to extend through a central aperture in the web 128 of the valve member 114 and is threadingly engaged with the retainer 142.

The electrical drive 46 is adapted to adjustably vary the preload imposed on the bias spring 134. In the illustrated embodiment, the electrical drive 46 includes an electric motor 144 powered by the battery 50. A slidable spring retainer 148 is splined for axial movement within an end member 146 suitably fastened fluid tightly to the housing 102, the splined engagement precluding rotational movement of the slidable spring retainer. The slidable spring retainer 148 has an internal screw threads that are threadingly engaged with a lead screw 152 formed integrally with an output shaft 150 of the motor 144. The shaft 150 is sealed by an O-ring 154 to prevent leakage of water.

With this arrangement, rotation of the motor 144 in a direction to displace the slidable spring retainer 148 to the right as viewed in FIG. 4 will increase the preload on the bias spring 134 to, in turn, increase the mixture temperature. Rotation of the motor 144 in the reverse direction will decrease the preload so that the mixture temperature will be lowered. The electrical drive 46 is designed and arranged such that the slidable spring retainer 148 is moved to the left through a sufficient stroke until the bias spring 134 is fully unloaded. It will be noted that, as the pressure of hot and cold water applied to the mixing section 22 has been reduced by the pressure reduction valves 14 and 18 as mentioned before, the sealing ring 154 for the output shaft 150 of the motor 144 is subjected to a limited pressure so that the frictional resistance due to the sealing ring 154 is limited. Therefore, pressure reduction is also advantageous in reducing the power consumption of the motor 144.

Figure 5:
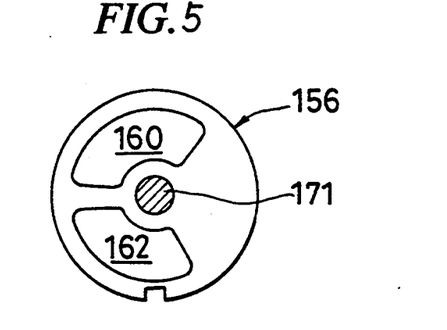
FIGS. 5 and 6 are elevational views taken along the lines V—V and VI—VI of FIG. 4, respectively.
Figure 6:
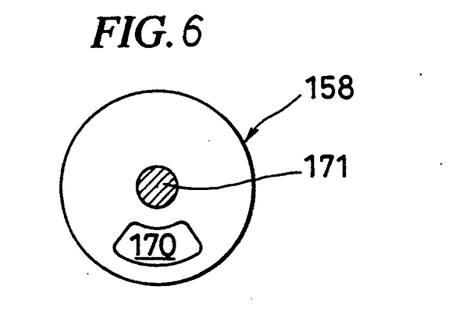

Referring further to FIG. 4, the mixture formed at the mixing section 22 flows toward the flow control valve 24, with the temperature thereof being detected by the thermistor 30. The flow control valve 24 includes a stationary disc 156, a rotary disc 158 and the geared motor 48 adapted to drive the rotary disc 158. The stationary disc 156 has two outlet ports 160 and 162, as best shown in FIG. 5, with the one port 160 being connected to the shower head 26 through an outlet fitting 164 and a shower hose 166 (shown only in FIG. 1), the other port 162 being connected to an outlet fitting 168 to which the faucet spout 28 is swiveled. As shown in FIG. 6, the rotary disc 158 has a single port 170 in communication with the mixing chamber 118 and is adapted to be rotated by an output shaft 171 of the motor 48. As the motor 48 rotates the rotary disc 158 to bring the port 170 thereof .into registration with the outlet port 160 of the stationary disc, water will be delivered to the shower head. Water will be delivered to the faucet spout when the port 170 is brought into registration with the outlet port 162. When the port 170 is offset either of the ports 160 and 162, water flow will be shut off.

Figure 7:
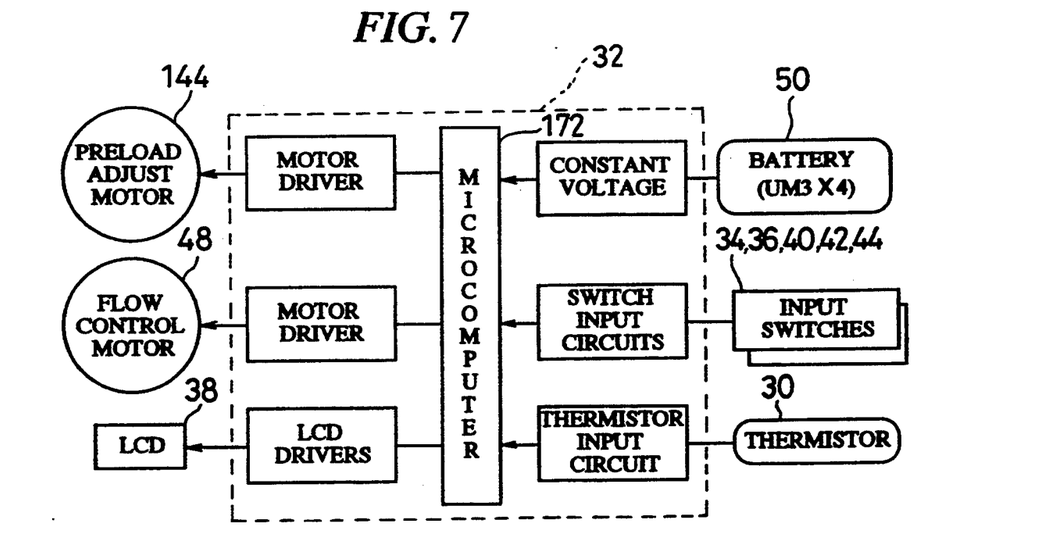
FIG. 7 is a block diagram of the electrical control unit of the first embodiment as connected to the associated components.

Referring to FIG. 7, there is shown the layout of the electrical components of the mixing valve 10. The control unit 32 may include a programmable microcomputer 172 which is programmed to perform temperature and flow control functions described later. The commands from the switches 34, 36, 40, 42 and 44 are input to or otherwise accessed by the microcomputer 172 through switch input circuits. The output of the thermistor 30 is transmitted to the microcomputer 172 via an associated input circuit. The microcomputer 172 drives the motors 144 and 48 and the LCD 38 through respective drivers. Electric power from the battery 50 is fed to the microcomputer 172 and the various drivers via a constant voltage circuit. The microcomputer 172 may be programmed such that, whenever operation of the mixing valve 10 is commenced, a default temperature of a safety level (for example, 40° C.) is set as the desired mixture temperature. Also, the microcomputer 172 may be programmed so that, whenever use of the mixing valve is terminated, the power is turned off only after the motor 144 of the electric drive 46 has adjusted the preload of the bias spring 134 to locate the valve member 114 to a such a position that the mixture of the default temperature is delivered.

Mode of use of the mixing valve 10 will be described in connection with the mode of operation. As the user presses on the shower delivery selection switch 40 or the faucet selection switch 42, the microcomputer 172 of the control unit 32 operates to set the default value (e.g., 40° C.) stored in the memory thereof as the desired mixture temperature and displays the desired temperature on the LCD 38. Then the motor 48 is operated to drive the flow control valve 24 to deliver water to the selected appliance. As a result, cold water from the supply line and hot water from the boiler are delivered to the mixing section 22 after the pressure thereof has been reduced by the pressure reduction valves 14 and 18.

At the outset, the mixing section 22 operates to mix hot and cold water in such a ratio that a mixture of the default temperature (40° C.) is provided, since at the end of the previous use the valve member 114 of the mixing section 22 has been so positioned as described before.

The control unit 32 monitors the actual temperature sensed by the thermistor 30 and commences the electrical feedback control of the mixture temperature by comparing the actual temperature with the desired temperature and by driving the electrical drive 46 such that the valve member 114 is properly positioned.

As the user presses on the temperature selection switch 34 or 36 to vary the desired temperature, the default temperature is decremented or incremented for each 1° C. and the new temperature is set as the desired temperature and is displayed on the LCD 38.

Figure 8A:
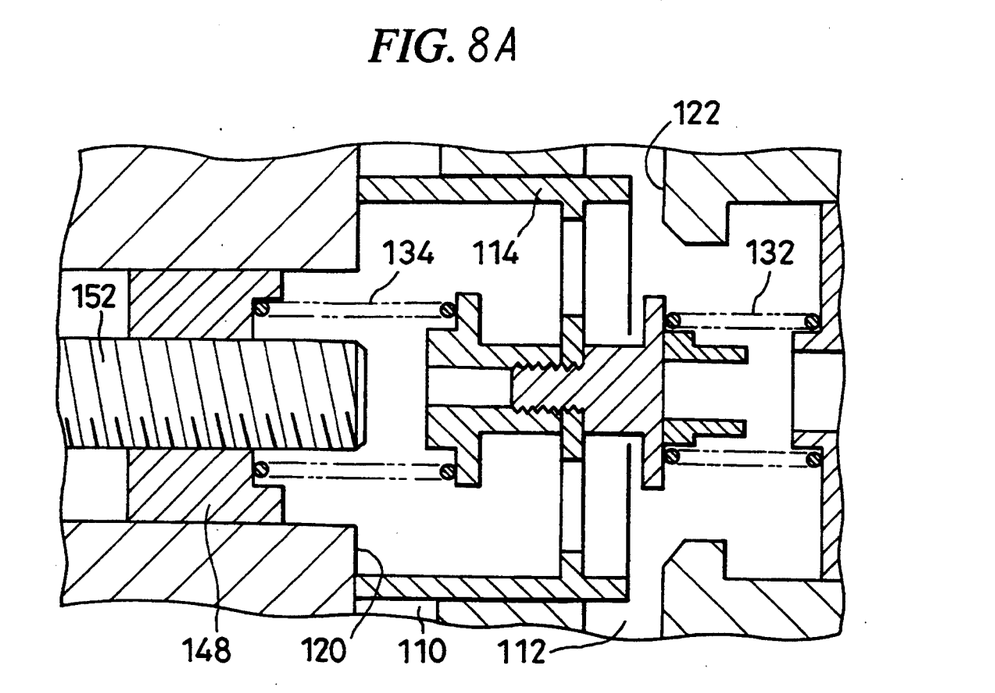
FIGS. 8A and 8B are enlarged cross-sectional views of the mixing section of the first embodiment showing the movable valve member as positioned in the hot water shut-off position and the cold water shut-off position, respectively.

When the user desired water delivery of the minimum temperature, i.e., direct delivery of cold water, the motor 144 is rotated to retract the movable spring retainer 148 until the preload on the bias spring 134 is fully relieved as shown in FIG. 8A. It will be noted that during the minimum temperature condition, the spring force developed by the SMA spring 132 is equally minimum and in the order of 500–700 g. However, as in this condition the SMA spring 132 suffers no counteractive spring force of the bias spring 134, the spring force of the SMA spring 132 is now fully available to urge the valve member 114 against the hot water valve seat 120 with an adequate sealing pressure enough to shut off the flow of hot water. Therefore, according the arrangement of the invention, it is possible to shut off hot water with a limited spring force which is advantageous in limiting the strain experienced by the SMA spring and in precluding premature fatigue thereof.

If, to the contrary, the electric drive 46 were to be arranged to the right as viewed in FIG. 4 in an attempt to vary the preload on the SMA spring, then during the minimum temperature condition wherein the modulus of elasticity of the SMA is minimum, the SMA spring must develop a spring force which is equal to the counteractive force of the bias spring plus the sealing pressure required to shut off hot water. In that case, the spring force of the SMA spring must be twice as high as that required in the arrangement of the invention. The result of this would be that the bending strain imposed on the SMA spring must be correspondingly increased.

Figure 8B:
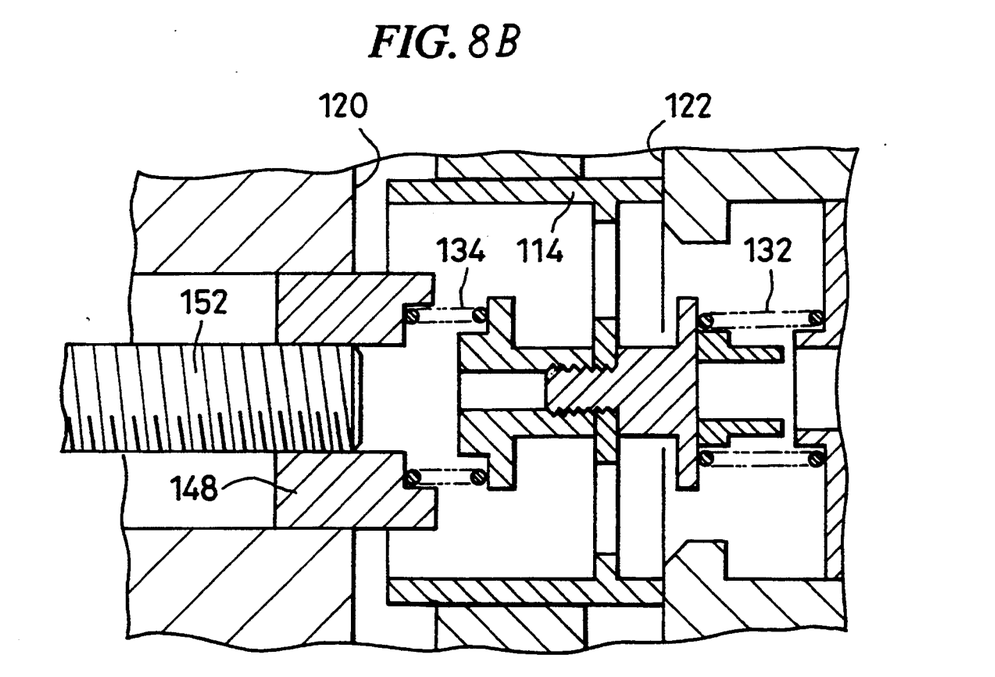

When the user desired water delivery of the maximum temperature, i.e., direct delivery of hot water, the motor 144 is rotated to advance the movable spring retainer 148 as shown in FIG. 8B. The bias spring 134 is fully compressed against the increased spring force of the SMA spring 132 to urge the valve member 114 against the cold water valve seat 122 with an adequate sealing pressure to shut off cold water.

As the user selected an intermediate temperature, the valve member 114 will be positioned in an intermediate position shown in FIG. 4 wherein the spring force of the SMA spring 132 and the spring force of the bias spring 134 are balanced. The control unit 32 operates to adjust the valve position in accordance with the actual mixture temperature so that the desired temperature is attained. This will be described in more detail with reference to the graph of FIG. 9 wherein the abscissa indicates the water temperature and the ordinate represents the spring force developed by the SMA spring 132 and the bias spring 134. For the purpose of simplicity, the hysteresis loop of the SMA spring is omitted from the graph but will be described later with reference to FIG. 11.

Figure 9:
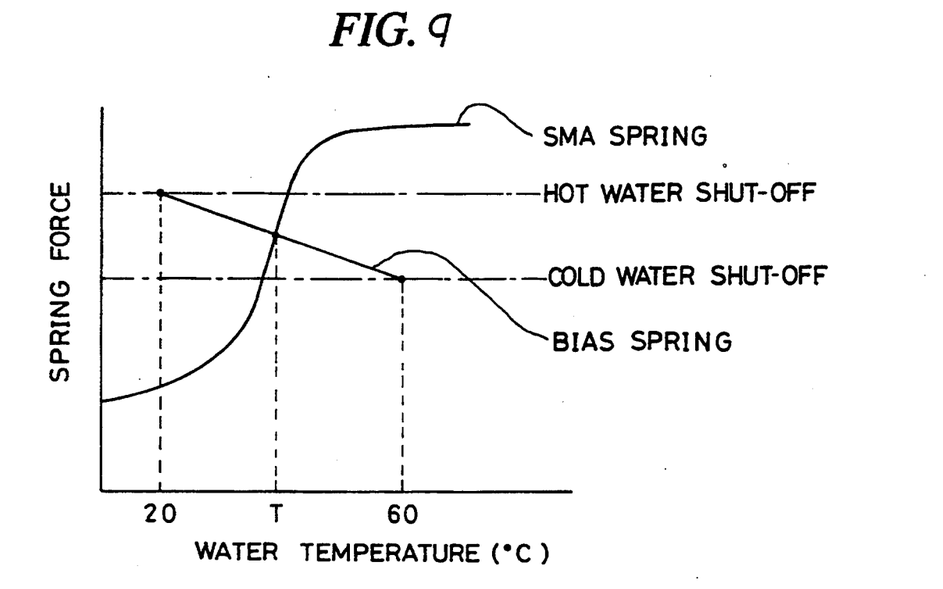
FIG. 9 is a graph showing the spring force of the SMA spring varying with water temperature as well as the spring force of the bias spring varying with the axial position of the valve member, with the hysteresis loop being omitted for simplicity from the spring force vs. temperature curve of the SMA spring.

Referring to FIG. 9, the SMA spring 132 exhibits spring force that varies with temperature as shown by the slanted S-shaped spring force vs. temperature curve. The bias spring 134 has a predetermined spring constant independent of the temperature but its spring force varies as shown by the inclined line in response to the stroke of the valve member 114 between the cold water shut-off position and the hot water shut-off position because the load imposed thereon varies according to the axial position of the valve member, it being understood that, although exaggerated in the graph of FIG. 9, the change in the bias spring force is quite small since the valve stroke is only in the order of 1 mm. As the valve member 114 is held between the springs 132 and 134, it will be brought to a position wherein the spring forces of the springs 132 and 134 are counterbalanced. This position corresponds to a point at which the spring force vs. temperature curve of the SMA spring intersects with the bias spring force line, so that a mixture of a temperature T is obtained. It will be understood that, as the preload on the bias spring 134 is varied, the line representing the bias spring force will be translationally shifted up and down in the graph of FIG. 9 along the ordinate so that the point of intersection will be shifted laterally along the abscissa. Thus, the control unit 32 operates the electric drive 46 to adjust the bias spring force so that the desired temperature selected by the user is established.

Whenever, during use of the mixing valve 10, the output temperature is transitionally deviated from the desired value due to fluctuation in the supply line pressures, hot and cold water supply temperature or flow rates, the SMA spring 132 quickly responds to such temperature change so as to rapidly control by mechanical feedback the position of the valve member 114, because the modulus of elasticity and, hence, the spring constant thereof are changed almost instantaneously. Such mechanical feedback control by the SMA spring 132 is performed much rapidly than the electrical feedback control by the control unit 32 wherein, in order to avoid erroneous function due to possible fluctuation in the signals from the thermistor 30, certain time delay must necessarily be provided in the program before determination is made that the water temperature has actually changed. It will also be noted that, since the responsiveness of the SMA spring 132 is much higher than that of the conventional wax type thermostatic control element, the amplitude and duration of overshooting and undershooting of temperature experienced with the mechanical feedback by the SMA spring is reduced to one tenth of that encountered with the wax type element.

Figure 10:
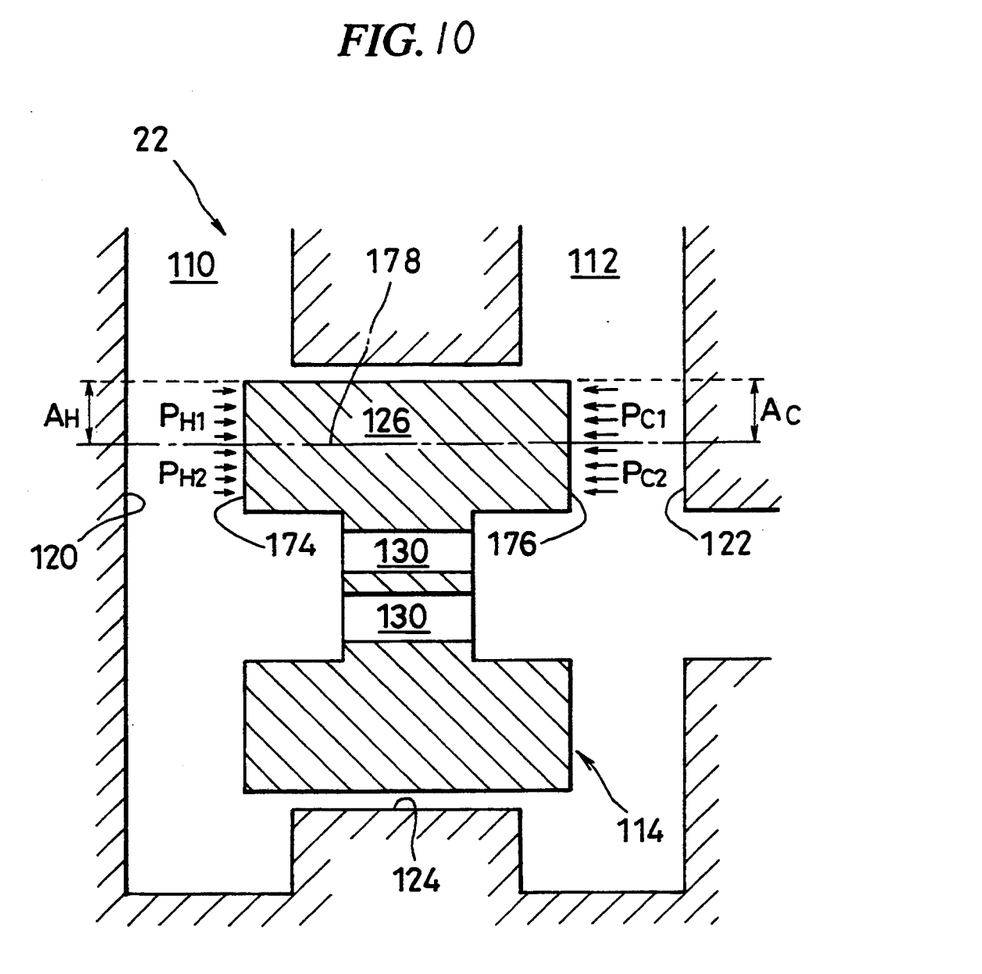
FIG. 10 is a schematic view illustrating the effect of differential pressure acting on the valve member.

In the arrangement of the invention wherein the valve member 114 is resiliently positioned between the SMA spring 132 and the bias spring 134, however, the valve member 114 is subject to axial thrust due to fluctuation in the differential pressure between hot and cold water. To explain with reference to the schematic diagram of FIG. 10, the gap between the hot water valve seat 120 and the left-hand end face 174 of the cylindrical portion 126 of the valve member 114 serves as a restriction that reduces the incoming hot water pressure $P_{H1}$ to the output pressure $P_{H2}$. Similarly, the gap between the cold water valve seat 122 and the right-hand end face 176 functions to reduce the incoming cold water pressure $P_{C1}$ to the pressure $P_{C2}$. It may be considered that the incoming pressures $P_{H1}$ and $P_{C1}$ act, respectively, on the outer annular pressure receptive areas $A_H$ and $A_C$ located radially outwards of the medium plane 178 of the cylindrical portion 126, with the output pressures $P_{H2}$ and $P_{C2}$ acting, respectively, on the inner pressure receptive areas, as shown. As the output pressure $P_{H2}$ can be regarded as being roughly equal to the pressure $P_{C2}$ because of the presence of openings 130 so that the hydraulic forces due to the output pressures are cancelled, the valve member 114 will be subjected, in total, to the hydraulic force $(A_H \times P_{H1})$ due to the incoming hot water pressure as well as to the hydraulic force $(A_C \times P_{C1})$ due to the incoming cold water pressure. It will be understood that, accordingly, the valve member 114 will undergo an axial hydraulic thrust if a differential pressure is generated between the incoming pressures $P_{H1}$ and $P_{C1}$ due to transient fluctuation thereof. In view of the limited spring force of the SMA spring 132, such thrust would be non-negligible and result in an undesirable offset of temperature. In the illustrated embodiment, however, the effect of differential pressure fluctuation is substantially eliminated because the pressure reduction valves 14 and 18 are provided to reduce the absolute pressure difference.

Figure 11:
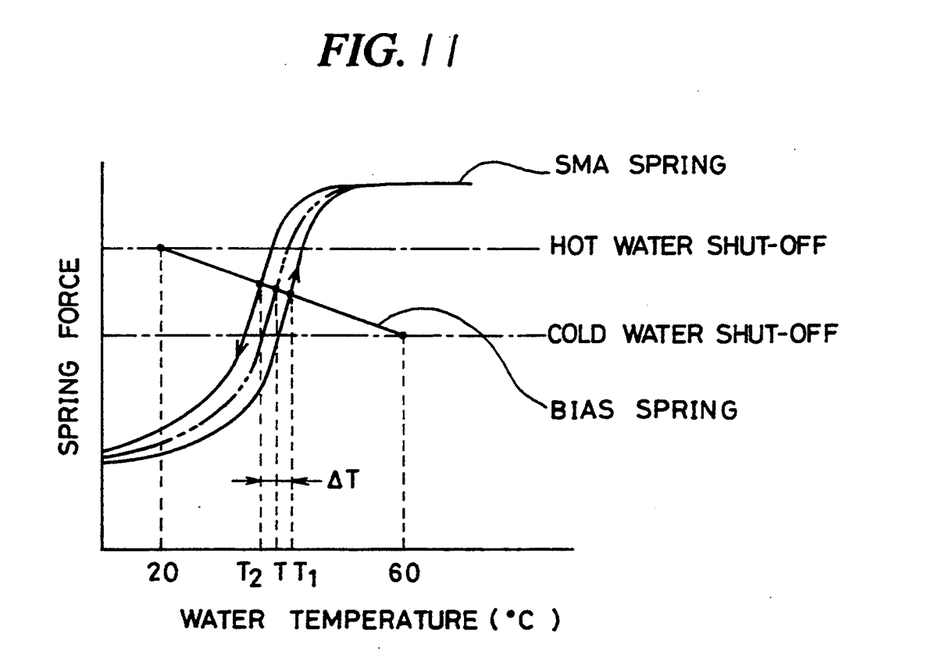
FIG. 11 is a graph similar to FIG. 9 but showing the hysteresis loop exhibited by the SMA spring.

Since in this manner one of the external disturbances is substantially removed from the system and because any transient offset is quickly compensated for by the mechanical feedback control performed by the SMA spring 132 having a high responsiveness, the number of electrical feedback control performed by the control unit 32 is minimized. As a result, the electrical drive 46 may be operated for a long time by the limited electric power available with the battery. The primary function of the electrical feedback control is to compensate for any persistent offset that might result from the hysteresis inherent in the SMA spring, degradation of the component parts, and fluctuation in the spring constant of the coiled springs 132 and 134 which may vary from spring to spring as a result of mass production. Actually, the spring force vs. temperature curve of the SMA spring 132 inherently presents a hysteresis loop as shown in FIG. 11. As a result, during transitional condition wherein the mixture temperature is raised, the spring forces of the springs 132 and 134 will be balanced at a point of intersection in which mixture at a temperature $T_1$ is obtained. When the water temperature is transiently lowered, the spring forces will be balanced at such a point that a mixture having a temperature $T_1$ is delivered. This would result in a temperature offset of delta T. According to the invention, however, such hysteresis originated offset is thoroughly eliminated by the electrical feedback control by the control unit 32 which continuously monitors the actual water temperature and operates to adjust it toward the desired temperature.

Figure 12:
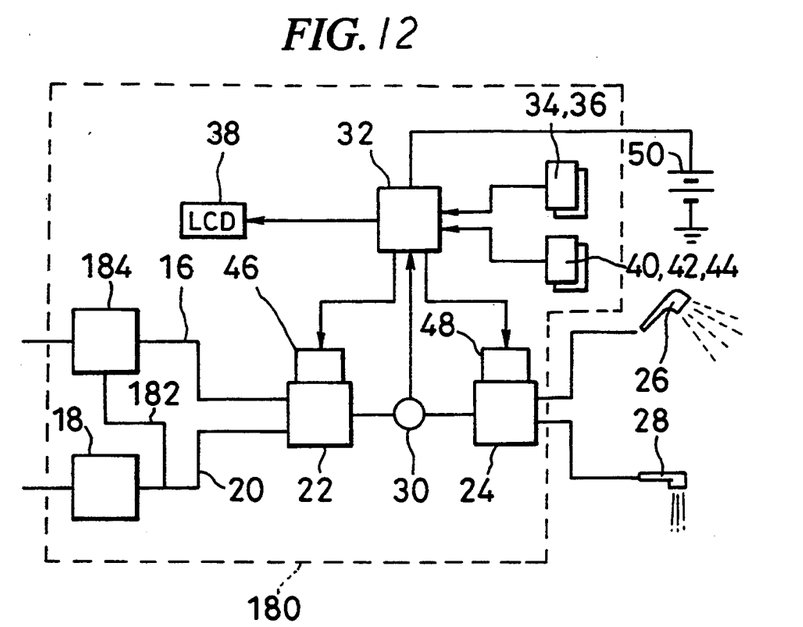
FIG. 12 is a diagrammatic representation similar to FIG. 1 but showing the mixing valve according to the modified embodiment of the invention.
Figure 13:
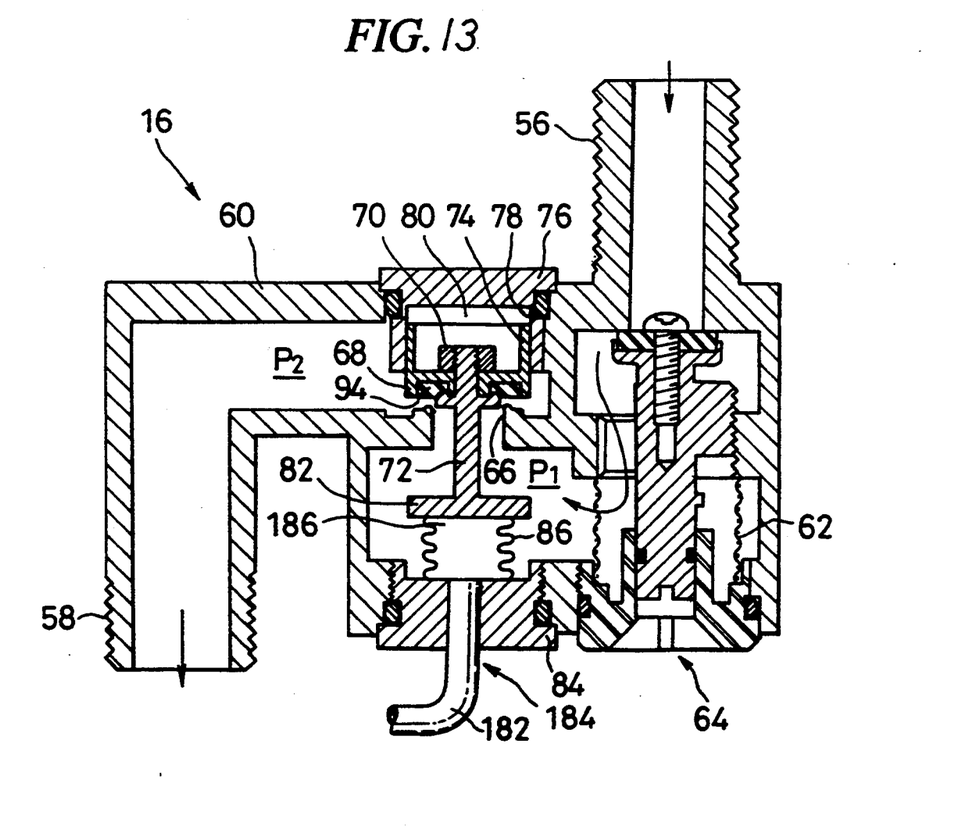
FIG. 13 is a cross-sectional view similar to FIG. 3 but showing the pressure control valve of the modified embodiment.

Referring to FIGS. 12 and 13, there is shown a modified embodiment of the invention. Parts and members similar to those of the first embodiment are indicated by like reference numerals and, therefore, need not be described. Only the difference will be described. As shown, the mixing valve 180 is designed such that the secondary or output pressure of the pressure reduction valve 18 for hot water is applied via a conduit 182 to a reduction valve 184 for cold water. Similar to the first embodiment, the reduction valve 184 is incorporated in the cold water inlet fitting 16. The reduction valve 184 is provided with a pressure chamber 186 which is defined by the metallic bellows 86 and into which the secondary pressure from the hot water pressure reduction valve 18 is admitted. With this arrangement, pressure reduction by the valve 184 is performed such that the hydraulic force acting on the closure member 68 due to the secondary cold water pressure reflected in the pressure chamber 80 is equal to the sum of the hydraulic force acting on the spring retainer 82 due to the hot water secondary pressure reflected in the pressure chamber 186 and the spring force of the bellows 86. As a result, the secondary cold water pressure will be higher than the secondary hot water pressure by a predetermined level which is dictated by the spring force of the bellows 86, so that the pressure difference between the inlet pressure at the hot water inlet 104 and the inlet pressure at the cold water inlet 106 is made constant. Accordingly, the valve member 114 of the mixing section 22 is subjected to a constant pressure difference regardless of any fluctuation in the supply line pressures. The axial thrust exerted on the valve member 114 due to the constant differential pressure may be readily compensated for by the control unit 32 operating to increase the preload on the bias spring 134.

Figure 14:
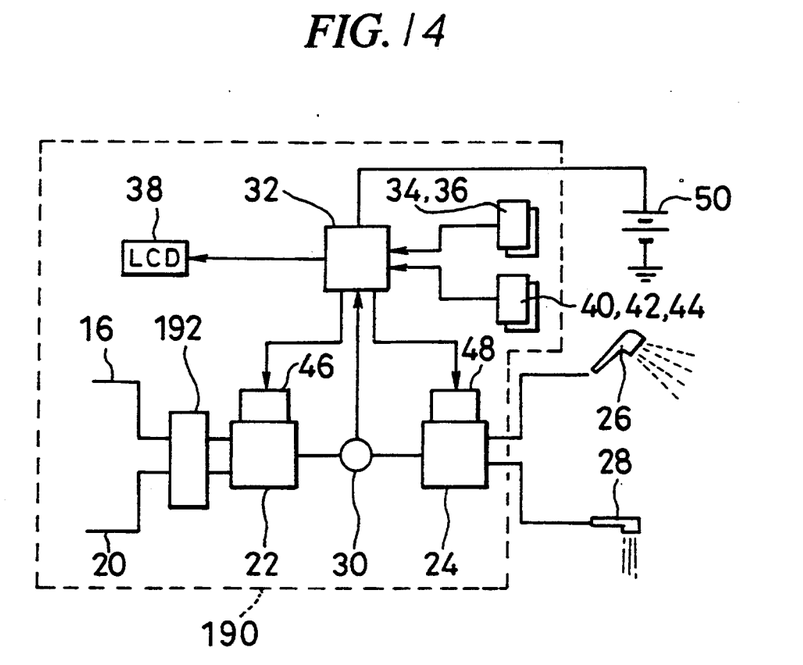
FIG. 14 is a diagrammatic view similar to FIG. 1 but showing the mixing valve according to another modified embodiment of the invention.
Figure 15:
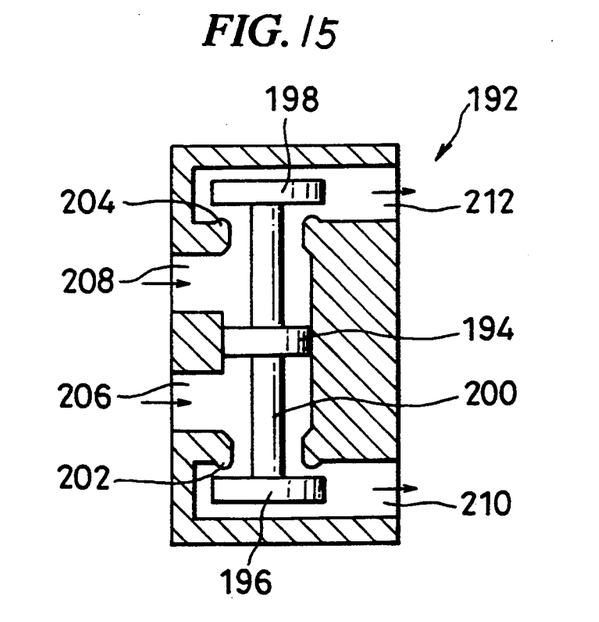
FIG. 15 is a cross-sectional view of the pressure equalizing valve used in the embodiment of FIG. 14; and, FIG. 16 is a cross-sectional view similar to FIG. 4 but showing the modified form of the mixing section.

FIGS. 14 and 15 illustrate another modified embodiment wherein a pressure equalizer arrangement is provided. Parts and members similar to those of the first embodiment are indicated by like reference numerals and, therefore, will not be described. The mixing valve 190 includes a pressure equalizing valve 192 which may suitably be arranged within the housing 12. The valve 192 has a piston 194 and a pair of movable closure members 196 and 198 which are connected with each other by a valve shaft 200. The closure member 196 cooperates with an annular valve seat 202 to control flow of hot water, with the closure member 198 cooperating with an annular valve seat 204 for cold water. The piston 194 and the valve seats 202 and 204 are so designed that the effective pressure receptive areas thereof are equal. Therefore, the hydraulic forces exerted on the closure member 196 and the piston 194 due to the pressure at a hot water inlet 206 are cancelled with each other and the hydraulic forces exerted on the closure member 198 and the piston 194 due to the pressure at a cold water inlet 208 are cancelled. The closure members 196 and 198 are subjected, respectively, to the downstream pressures at hot and cold water outlets 210 and 212. The equalizer valve 192 operates such that the pressures at the outlets 210 and 212 are held equal. The provision for the equalizing valve 192 is advantageous in exempting the valve member 114 from any axial thrust regardless of fluctuation in the supply line pressures.

Figure 16:
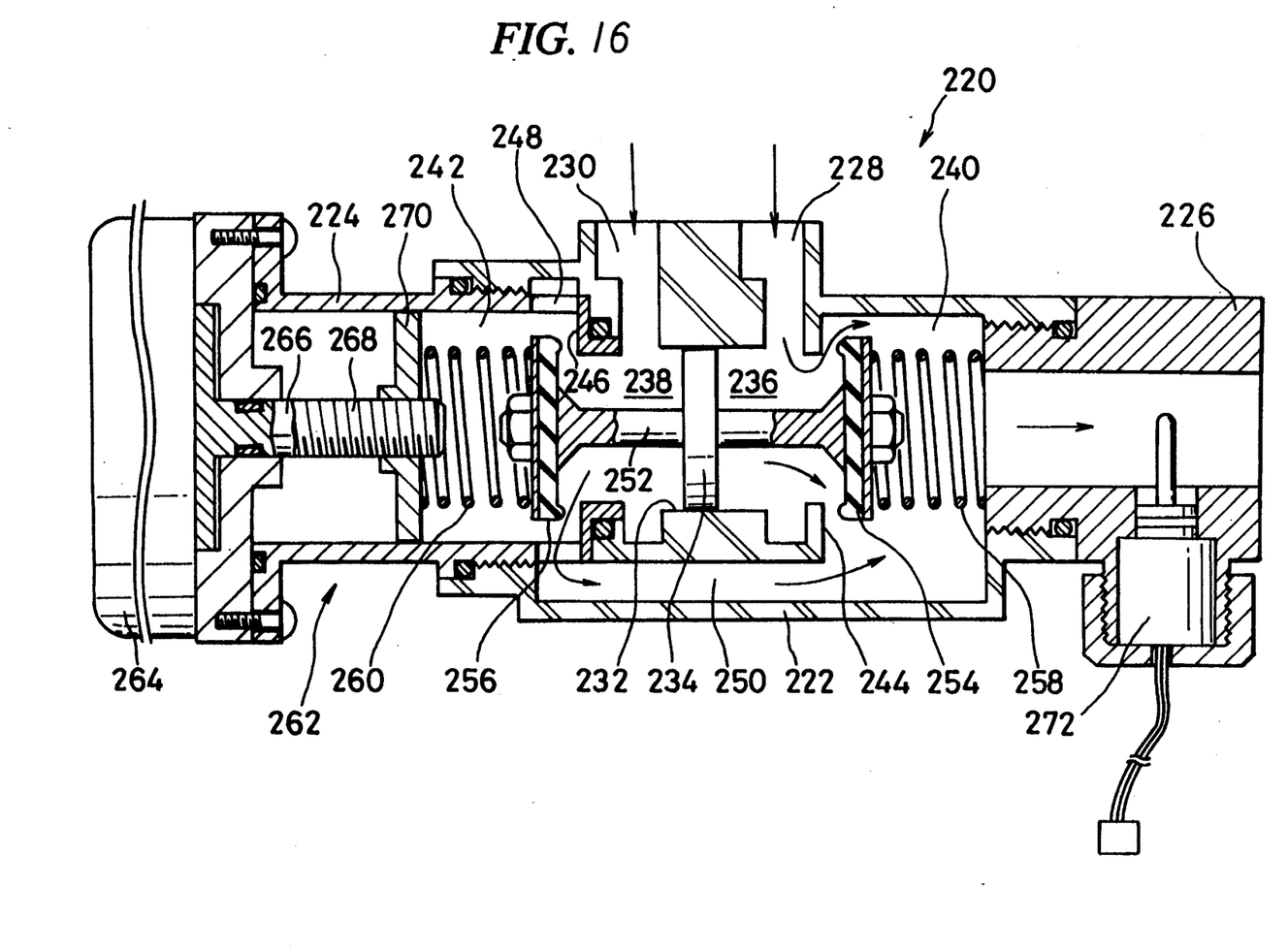

In FIG. 16, there is shown a modified form of a mixing section which may be used in place of the mixing section 22 described with reference to the first embodiment.

Referring to FIG. 16, the mixing section 220 includes a generally tubular housing 222 to which a tubular guide 224 and an outlet fitting 226 are liquid tightly and threadingly secured. The housing 222 has an inlet 228 for hot water and an inlet 230 for cold water. The housing 222 has a central bore 232 in which a piston 234 is slidably fitted. The inner space of the housing 222 is divided by the piston 234 into a primary pressure chamber 236 for hot water and a primary pressure chamber 238 for cold water. These chambers 236 and 238 are in communication with valve chambers 240 and 242, respectively, via a valve seat 244 formed integrally with the housing 222 and a valve seat insert 246 fixed by the guide 224. The valve chamber 242 is communicated with the chamber 240 via a plurality of apertures 248 in the guide 224 and a longitudinal passage 250 in the housing 222, to permit cold water in the chamber 242 to flow into the chamber 240 for mixing with hot water. Accordingly, the valve chamber 240 also serves as a mixing chamber.

The piston 234 has an integral shaft 252, to the ends of which movable closure members 254 and 256 are rigidly secured by nuts for conjoint axial movement with the piston. The piston 234, the valve seats 244 and 246 and the closure members 254 and 256 are all axially aligned with each other and have an equal pressure receptive area.

The closure member 254 is biased toward the associated valve seat 244 by a coiled spring 258 of SMA which is similar to the SMA spring 132 of the first embodiment. The closure member 256 is normally biased toward the corresponding valve seat 246 by a bias spring 260 supported by an electric drive 262 which is adapted to vary the preload of the bias spring 260. Similar to the electric drive 46 of the first embodiment, the drive 262 includes a motor 264 having an output shaft 266 provided with an integral lead screw 268 threadingly engaging a spring retainer 270 suitably splined in the tubular guide 224. A thermistor 272 is mounted to the outlet fitting 226 to sense the actual temperature of mixture formed in the mixing chamber 240.

The motor 264 of the electric drive 262 may be feedback controlled by the control unit 32 in as much the same manner as described with reference to the first embodiment. Moreover, mechanical feedback control by the SMA spring 258 is performed in a similar manner. Therefore, only the difference in the operation of the mixing section 220 will be described.

The pressure in the primary pressure chamber 236 operates to urge the closure member 254 away from the associated valve seat 244 as well as to bias the piston 234 to the left as viewed in FIG. 16. Since the effective pressure receptive areas of the piston 234 and the closure member 254 are equal as aforementioned, the hydraulic forces acting thereon due to the primary water pressure in the chamber 236 are cancelled with each other. Similarly, the hydraulic forces acting on the closure member 256 and the piston 234 due to the primary pressure in the chamber 238 are cancelled. Therefore, the closure members 254 and 256 are free from any axial thrust due to the primary pressure regardless of pressure difference that may exist between the water inlets 228 and 230. The closure members 254 and 256 are also free from any axial thrust due to the secondary pressure in the chambers 240 and 242 because these chambers are connected by the passage 250 and are subjected to the identical pressure. Accordingly, the advantage of the mixing section 220 is that the effect of differential pressure, whether transitional or persistent, is entirely eliminated. This is particularly advantageous in providing a battery operated mixing valve. It will also be noted that the mixing section 220 is simple in structure and may be made compact in size.

While the present invention has been described herein with reference to the specific embodiments thereof, it is contemplated that the invention is not limited thereby and various modifications and alterations may be made therein without departing from the scope of the invention.

We claim:

1. An electromechanically controlled thermostatic mixing valve comprising:
   a housing having an inlet for hot water, an inlet for cold water, a mixing chamber in communication with said inlets, and an outlet discharging from said mixing chamber;
   movable valve means disposed in said housing for controlling the flow of hot and cold water flowing into said mixing chamber to control the temperature of a mixture of hot and cold water formed in said mixing chamber, said valve means being movable between a first position wherein the temperature of said mixture is minimized and a second position wherein the temperature of said mixture is maximized;
   a temperature-responsive first coiled spring disposed in said chamber for biasing said valve means toward said first position, said first spring being made of a material having a spring constant that increases in response to the increase in the temperature of said mixture thereby to exert on said valve means an increasing spring force as the temperature of said mixture is raised;
   said first spring being held in a slightly compressed state throughout the movement of said valve means between said first and second positions;
   a second coiled spring disposed in said housing for biasing said valve means toward said second position, said second spring having a predetermined spring constant substantially independent of the temperature of said mixture, said second spring having an end engaging said valve means;
   electrical drive means acting on the other end of said second spring for adjustably varying the preload on said second spring;
   temperature sensing means for sensing the actual temperature of said mixture;
   input means for selecting the desired temperature for said mixture; and,
   electrical control means responsive to said temperature sensing means and said input means for controlling said electrical drive means;
   said valve means being resiliently supported between said first and second springs, when said valve means is situated in an intermediate position between said first and second positions, to permit said valve means to move in response to any change in the spring force of said first spring due to variation in the temperature of said mixture until the spring forces of said first and second springs are counterbalanced;

said control means being operable to control said electrical drive means, when said valve means is situated in said intermediate position, to adjustably vary the second spring such that the actual mixture temperature is brought to the selected desired temperature;

said control means being operable to control said electrical drive means, when said valve means is to be positioned in said first position for delivery of mixture of the minimum temperature, to substantially relieve the preload on said second spring to permit said first spring to bias said valve means toward said first position without suffering the counteractive force of said second spring;

said control means being operable to control said electrical drive means to increase the preload on said second spring in response to the increase in said desired temperature.

2. A thermostatic mixing valve according to claim 1, wherein said first spring is designed to develop less than about 700 g of spring force when said valve means is in said first position.

3. A thermostatic mixing valve according to claim 2, wherein said first spring is designed to develop less than about 500 g of spring force.

4. A thermostatic mixing valve according to claim 3, wherein said valve means is disposed in said housing substantially freely from frictional resistance.

5. A thermostatic mixing valve according to claim 1, further comprising pressure control means for reducing the inlet pressures at said water inlets.

6. A thermostatic mixing valve according to claim 1, further comprising pressure control means for equalizing the inlet pressures at said water inlets.

7. A thermostatic mixing valve according to claim 1, further comprising pressure control means for providing the pressure difference between said water inlets constant.

8. A thermostatic mixing valve according to claim 1, further comprising pressure receptive means associated with said valve means for counterbalancing the hydraulic force acting on said valve means due to the inlet pressure at said cold water inlet with the hydraulic force acting on said valve means due to the inlet pressure at said hot water inlet.

9. A thermostatic mixing valve according to claim 1, wherein said first spring is made of an alloyed metal having a shape memory effect.

10. In combination with a thermostatic mixing valve having a movable valve member positioned between first and second coiled springs for controlling the temperature of a mixture of hot and cold water, said first spring being made of a material having a temperature-responsive spring constant that varies with the temperature of said mixture, said second spring having a predetermined spring constant substantially independent of the temperature of said mixture, the improvement comprising:

temperature sensing means for sensing the actual temperature of said mixture;

input means for selecting the desired temperature for said mixture;

electrical drive means for adjust the biasing force of said springs; and, electrical control means responsive to said temperature sensing means and said input means for controlling said electrical drive means;

said valve member being resiliently supported between said first and second springs to permit said valve member to quickly move in response to any change in the spring force of said first spring due to variation in the temperature of said mixture to a position in which the spring forces of said first and second springs are counterbalanced;

said control means being operable to actuate said electrical drive means upon sensing an offset of the actual temperature of said mixture from the desired temperature to bias said valve member to such a position in which the actual temperature of said mixture as sensed by said sensing means is brought to the desired temperature as selected by said input means.

* * * * *